Figure 4:
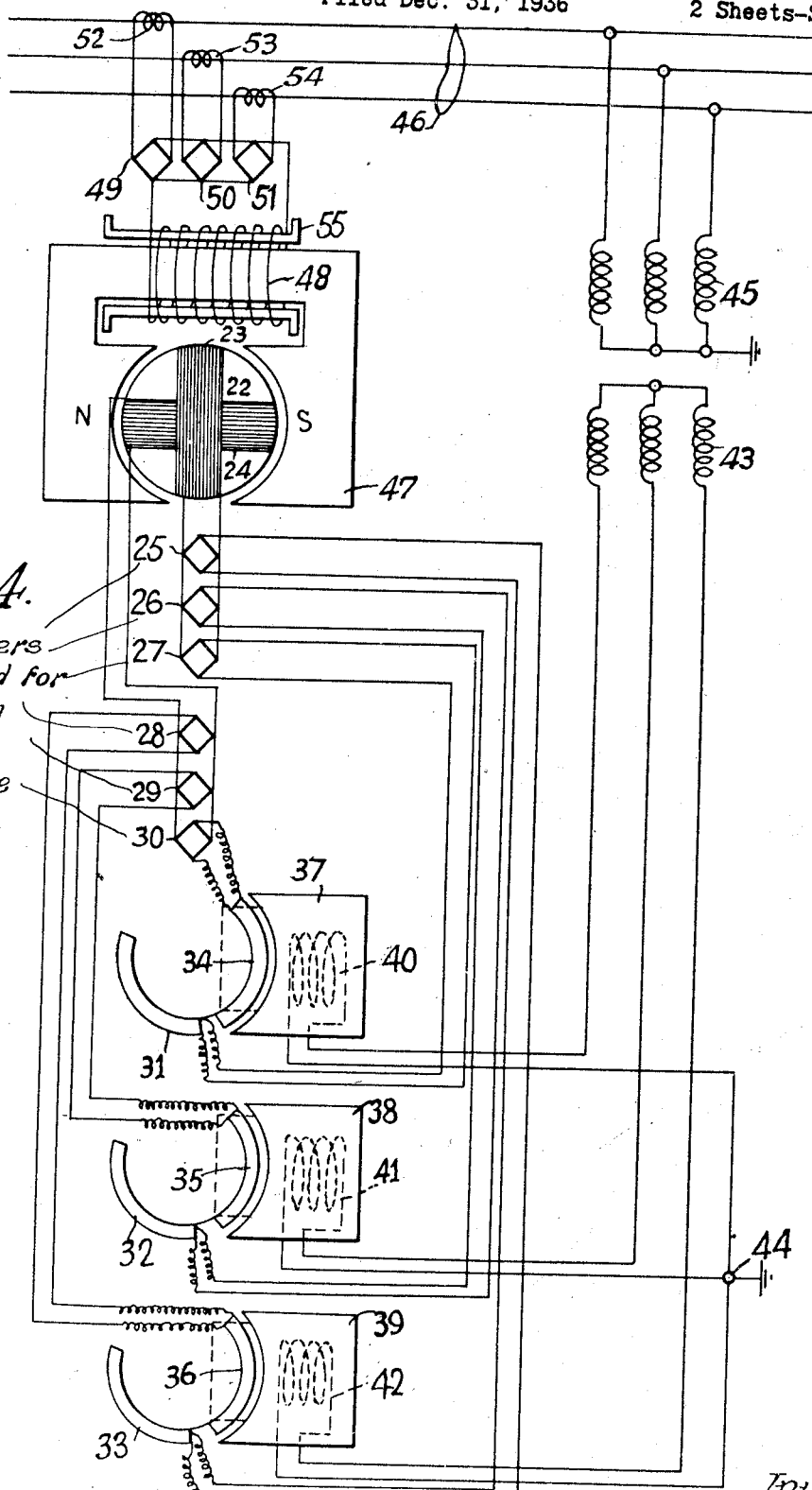

June 18, 1940.　　　　G. F. SHOTTER　　　　2,204,916
ELECTRIC MOTOR
Filed Dec. 31, 1936　　　　2 Sheets-Sheet 1
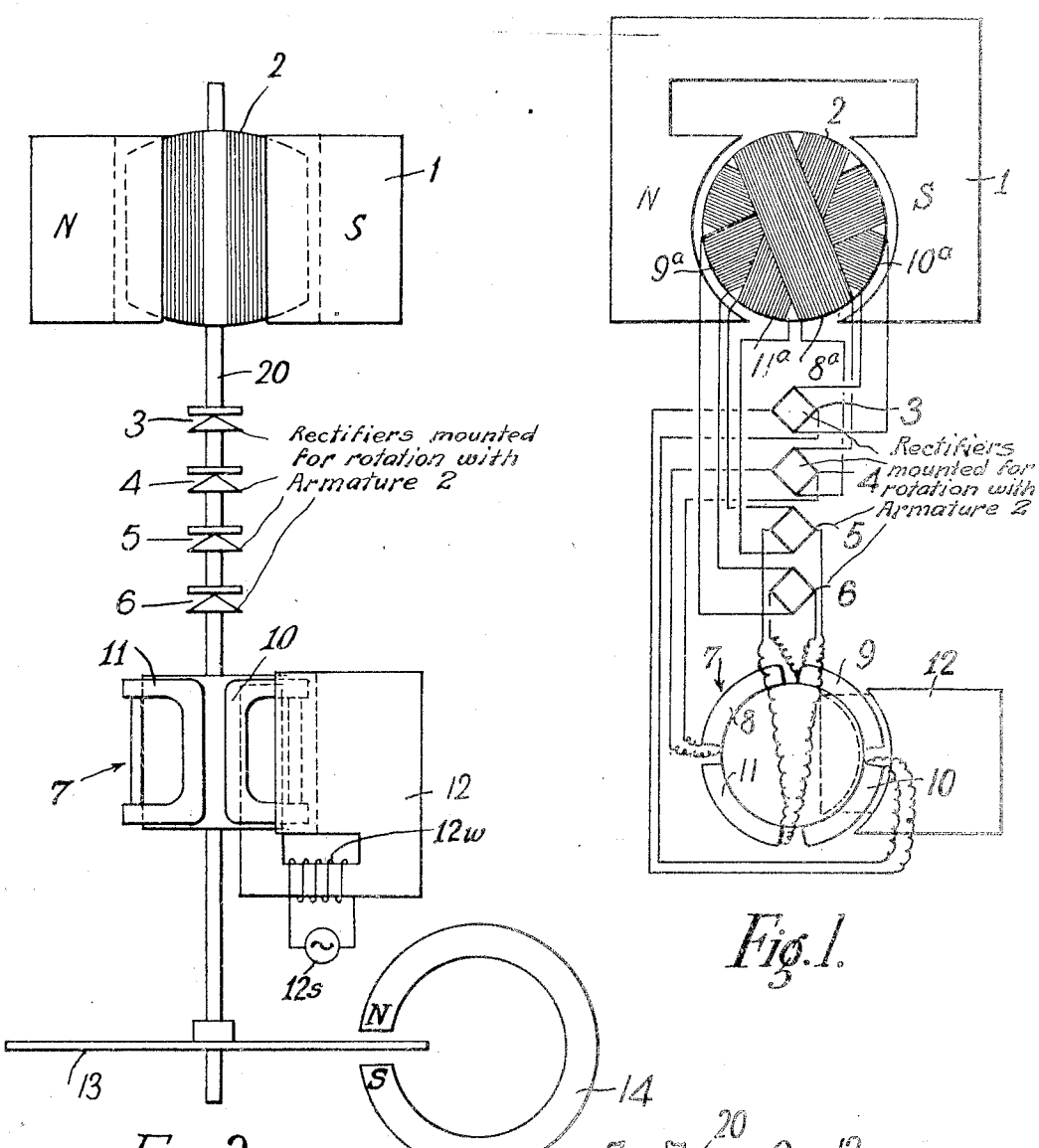
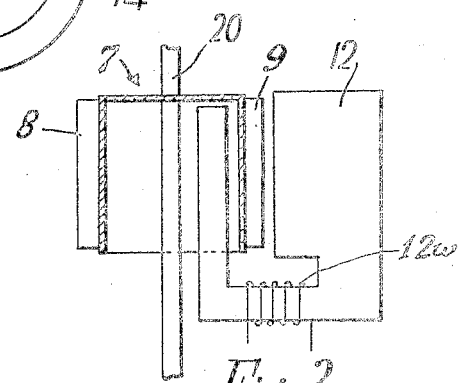
Fig.1.
Fig.2.
Fig.3.
Inventor
George Frederick Shotter June 18, 1940.   G. F. SHOTTER   2,204,916
ELECTRIC MOTOR
Filed Dec. 31, 1936   2 Sheets-Sheet 2

Rectifiers mounted for rotation with Armature 22

Inventor:
George Frederick Shotter.
By Brown, Jackson, Boettcher & Dienner
Attys.

Patented June 18, 1940

2,204,916

UNITED STATES PATENT OFFICE 2,204,916

ELECTRIC MOTOR

George Frederick Shotter, Friern Barnet, England

Application December 31, 1936, Serial No. 118,454
In Great Britain January 2, 1936

8 Claims. (Cl. 172—36)

The present invention relates to improvements in or relating to electrically driven movements, motors or the like and has for its object the elimination of switching commutator arrangements in movements or motors of the type in which current is supplied to the rotor or like moving element.

Broadly speaking the invention consists in an electrically driven movement, motor or the like in which the direction of current flowing in a conductor or conductors of the armature relative to the exciting field is determined by a rectifier or rectifiers in circuit therewith, while the strength of the current flowing is determined in accordance with the relative position of the armature and the exciting field.

According to a feature of the invention rectifiers and inducing means variably controlled by the moving element are arranged to cause current to flow in a certain direction in a conductor or conductors of an armature and only when said conductor or conductors are in a certain position or positions with relation to an exciting field so as to ensure continued movement thereof.

According to a further feature of the invention the strength of current in a conductor of an armature is determined by the position of the conductor relative to an exciting field and the direction of the current in the conductor for instance as determined by a rectifier is unchanged in such a way as to ensure that the moving element is attracted in one direction to such a degree as to ensure continuity of its movement in said direction.

In one embodiment of the invention, alternating currents are supplied to the moving element by electromagnetic induction and are rectified by a plurality of rectifiers associated with the moving element, the output from the rectifiers being employed to excite a coil or coils associated with the moving element in such a manner as to ensure continuity of movement of the moving element in the same direction due to the interaction between the magnetic field set up by the coil or coils and a second magnetic field.

The supply of alternating currents to the armature is effected by electromagnetic induction into a set of coils provided on the rotor and each coil is connected over a rectifier to a correspondingly positioned coil of a second set of coils forming the armature so that the magnetic field set up by the second set of coils due to alternating currents being induced in the first set interacts with a unidirectional magnetic field to ensure continuity of movement of the rotor in the same direction.

The invention is particularly applicable to electricity measuring instruments, for instance if the magnetic field with which the armature interacts is set up in accordance with the current flowing in the load circuit and the current induced in the armature is dependent upon the voltage of the circuit, then the combination can form a kilovolt-ampere meter.

If the field is supplied by a permanent magnet and if the current induced in the armature is dependent upon the current flowing in the load circuit then the arrangement will make a convenient form of ampere hour meter, or alternatively if the voltage supply is maintained constant and the current controls the field then the same result can be obtained. Furthermore as the speed of the movement will vary in dependence upon the product of the strength of the field and the strength of the current in the armature, the variations of voltage or current can be transmitted to a distance by any suitable transmitting arrangement responsive to impulses generated for each revolution or portion of a revolution of the rotor, the period between two pulses being an indication of the average voltage or current at that time.

It should be understood that the invention is not solely applicable to single phase working but can be easily arranged to operate with a two phase or three phase supply.

The arrangement also permits of the obtaining of an electric motor which when operated by alternating current has the characteristics as regards starting torque and other qualities of a direct current motor and avoids the use of switching commutators therefor. Generally speaking the arrangement will be most applicable for small powers unless provision is made for rectifiers to deal with large quantities of current or the voltage is increased by transformer action.

The invention will be better understood by referring to the accompanying drawings in which Figure 1 represents diagrammatically an arrangement according to the invention for operating a kilovolt-ampere meter on a single phase supply; Figure 2 illustrates a constructional arrangement of Figure 1; Figure 3 illustrates in section the arrangement shown in Figures 1 and 2 for transferring alternating current power to the rotor; and Figure 4 represents diagrammatically an arrangement according to the invention for operating a kilovolt-ampere meter adapted for use with a three phase supply.

Referring to Figures 1 and 2 of the drawings, it will be noted that the rotor comprises an armature 2, rectifiers 3, 4, 5 and 6, an element, shown generally at 7, carrying a plurality of coils 8, 9, 10 and 11, and a braking disc 13, all mounted on the same shaft 20. The rectifiers, which are of the static type, may conveniently be mounted on a plate fixed to the rotor shaft 20. The armature 2 rotates in the field of a permanent magnet 1, while the element 7 carrying the coils 8, 9, 10 and 11 rotates between the poles of an electromagnet 12 having a winding 12w thereon connected for energization to a suitable source of alternating current 12s. The brake disc 13 rotates between the poles of a permanent magnet 14. The coils 8, 9, 10 and 11 lie on the cylindrical surface of the element 7 so that as they travel they are subjected to degrees of induction from the alternating current electromagnet 12 varying from a maximum when they lie with their axis in the midpoint of the inducing magnetic field to zero when their axis is outside the inducing magnetic field. The electromagnet 12 is conveniently excited by a shunt winding responsive to voltage variations of the alternating current supply and serves to induce current into the coils 8, 9, 10 and 11 depending upon their position as well as upon the voltage of supply. Each of the coils 8, 9, 10 and 11 is connected to a rectifier which, as shown in Figure 1, takes the form of a double wave rectifier although they may be single and half wave rectifiers if desired. The coil 10 is connected to the rectifier 3, the coil 11 to the rectifier 5, the coil 8 to the rectifier 4 and the coil 9 to the rectifier 6. The output from the rectifiers is connected to coils wound on the armature 2, the coil 10 on the element 7 being connected through rectifier 3 to the coil 10a, coil 11 through rectifier 5 to 11a, coil 8 through rectifier 4 to 8a and coil 9 through rectifier 6 to 9a. In the position shown in Figure 1 it will be noted that current will be induced in the coils 9 and 10 but not in the coils 8 and 11. The direction of current flowing in the coil 9a will be such as to cause the armature to rotate in a particular direction, for instance the clockwise direction so that gradually the coil 10 passes beyond the field while the coil 9 becomes further excited. Subsequently the coil 8 has a current induced into it when the coil 10 has definitely left the field. In this way it will be noted that the excitation of the successive coils will always be in a certain direction when in a certain position and will not take place when in a position where the same currents would retard movement. In other words the effect of the arrangement is equivalent to that of a commutator and the motion of the armature 2 is effected in a similar way to that which is usually brought about by commutator segments.

Referring now to the embodiment shown in Figure 4, it will be seen that the armature 22 is in this case provided with two windings 23 and 24. Full wave rectifying units 25, 26 and 27 have their outputs serially arranged with the winding 23 and the output of three similarly arranged rectifying units 28, 29 and 30 is serially connected with the winding 24. The input to the rectifiers 25, 26 and 27 is derived from the three coils 31, 32 and 33 and the input to the rectifiers 28, 29 and 30 from the coils 34, 35 and 36, respectively. It will be understood that the armature 22, the rectifiers 25, 26, 27, 28, 29 and 30, and the coils 31, 32, 33, 34, 35 and 36 together comprise the rotor of the instrument and are mounted to rotate together. The pairs of coils 31 and 34, 32 and 35 and 33 and 36 are arranged to move in a field set up by the electromagnets 37, 38 and 39 which are energized by coils 40, 41 and 42, respectively. These coils are connected between the secondary windings 43 of a voltage transformer and a common earth connection 44. The primary windings 45 of the voltage transformer are connected to a three-phase line indicated by 46.

The armature 22 rotates between the poles of an electromagnet 47 which is energized by a coil 48 fed from three serially arranged full-wave rectifying units 49, 50 and 51. These rectifying units are connected, respectively, with three current transformers 52, 53 and 54, each associated with a particular phase of the three-phase line 46.

It will thus be appreciated that the field set up by the electromagnet 47 will be due to the sum of the currents flowing in each of the phases of the line at any particular moment. Further, by winding the coil 48 on a copper sleeve member indicated at 55, the output from the rectifiers 49, 50 and 51 is smoothed so that the alternating current ripple is considerably decreased. The magnetic field set up between the pole pieces of the electromagnet 47 is thus a unidirectional field of substantially constant value. With regard to the currents induced into the coils 31 to 36, inclusive, it will be understood that these currents will be proportional to the sum of the voltages existing at any particular moment between the three phases of the line. In the position shown in Figure 4 of the drawings, the current induced into the coils 34, 35 and 36 is a maximum, while that induced in the coils 31, 32 and 33 is zero and consequently the current flow through the coil 24 is a maximum and that through the coil 23 is zero. The mounting of the armature 22 is so arranged that under these circumstances the coil 24 is in such a position that the interaction between the field set up by the coil 24 and the field set up by electromagnet 47 is a maximum. The resulting torque acting on the armature 22 will cause the rotation of the latter in a particular direction and it will be appreciated from a consideration of the description given in connection with the previous embodiment that the continued interaction of the two fields will be such as to cause the continued movement of the armature 22 in the same direction to give an indication of the energy consumption.

It will be understood that the arrangement as illustrated above is only given by way of example and that additional applications of the various forms of metering power and current or voltage could also be used for other purposes, for instance if different permanent magnets were used to control the strength of the magnetic field of the rotor then the strength of these magnets could be measured. It should also be understood that while a rotary movement is the usual movement which will be obtained by a device of this character the principle might be applied to producing a longitudinal movement or movement in any particular path by arranging along the path direct magnetic fields of alternate polarity and supplying alternating current to coils on a member designed to travel along that path such coils being appropriately excited with relation to the fields in a similar manner to that shown and which could in fact be produced by a development of the rotor.

I claim:

1. An electrical device comprising, in combination, a rotor, two sets of coils carried by said rotor, a plurality of rectifiers carried by said rotor, circuit means connecting each coil of one set to a correspondingly positioned coil of the other set through one of said rectifiers, means for inducing alternating current into the coils of one of said sets, and unidirectional magnetic field means cooperating with the coils of the other of said sets, the magnetic field of said unidirectional magnetic field means being independent of the current in said rotor.

2. An electrical device comprising, in combination, a rotor, two sets of coils carried by said rotor, a plurality of rectifiers carried by said rotor, circuit means connecting each coil of one set to a correspondingly positioned coil of the other set through one of said rectifiers, alternating magnetic field means cooperating with the coils of one of said sets, a winding on said alternating magnetic field means for connection to a source of alternating current, and unidirectional magnetic field means cooperating with the coils of the other of said sets, the magnetic field of said unidirectional magnetic field means being independent of the current in said rotor, said sets of coils being so disposed on said rotor that unidirectional current is caused to flow in the coils of said other set and said rotor is caused to rotate on induction of alternating current in the coils of said one set.

3. In combination, in an electricity measuring instrument, a load circuit, a first electromagnet and a second electromagnet, each said electromagnet being provided with an energizing coil, the current flow in said first energizing coil being proportional to the current in said load circuit and the current flow in said second energizing coil being proportional to the voltage across said load circuit, an armature, a first coil and a second coil mounted on said armature, and a rectifier of the static type supported on said armature, said first coil and said second coil being connected together through said rectifier, said first coil being located in the magnetic field set up by said first electromagnet and said second coil being located in the magnetic field set up by said second electromagnet.

4. In combination, in an electricity measuring instrument, a load circuit, a first electromagnet and a second electromagnet, each said electromagnet being provided with an energizing coil, the current flow in said first energizing coil being proportional to the current in said load circuit and the current flow in said second energizing coil being proportional to the voltage across said load circuit, an armature, a first coil and a second coil mounted on said armature, a rectifier of the static type supported on said armature, said first coil and said second coil being connected together through said rectifier, said first coil being located in the magnetic field set up by said first electromagnet and said second coil being located in the magnetic field set up by said second electromagnet, and electromagnetic means for braking the movement of said armature.

5. An electricity measuring instrument comprising a three-phase transmission network, an electromagnet having polepieces, rectifying means for energizing said electromagnet to generate a unidirectional exciting field between said polepieces proportional to the current in said network, an armature movable in said exciting field, a pair of coils mounted on said armature, a set of electromagnets each energized in accordance with the voltage in one of the phases of said network, a plurality of pairs of coils movable with said armature, each pair of coils being associated with one of said electromagnets and having current induced therein by its associated electromagnet, and two sets of rectifiers of the static type each set being common to one of said first pair of coils and individual to corresponding ones of said second pairs of coils and serving to conduct current successively from one coil of each of said second pairs of coils to the corresponding coil of said first pair whereby the interaction between the exciting field and the field set up by the current in said first pair of coils serves to insure continuity of movement of the armature.

6. An electrically driven movement comprising a magnet having polepieces, an armature situated between said polepieces and movable relative thereto, means for generating a unidirectional magnetic field in said magnet and said armature, a set of coils mounted on said armature, a plurality of rectifiers of the static type supported on said armature and each connected in circuit with one coil of said set, an electromagnet, a source of alternating current for energizing said electromagnet, and a second set of coils mounted on said armature for supplying current to said first set of coils through the associated rectifiers due to the current induced into said second set of coils by said electromagnet, the direction of current flow through said first set of coils being determined by said rectifiers and the strength of the current through said first set of coils being controlled by the instantaneous position of the corresponding coils of said second set.

7. An electrically driven movement comprising a magnet having polepieces, an armature situated between said polepieces and movable relative thereto, means for generating a unidirectional magnetic field in said magnet and said armature, a plurality of coils mounted on said armature, a plurality of rectifiers of the static type of which at least one is connected in circuit with each of said coils and supported on said armature, a plurality of electromagnets, a source of alternating current for energizing said electromagnets, and a set of coils associated with each of said electromagnets and mounted on said armature, the current induced in corresponding coils of said sets under the influence of said electromagnets flowing through said rectifiers to a corresponding one of said first coils, the direction of current flow through said first coils being determined by said rectifiers and the strength of the current through said first coils being controlled by the instantaneous position of the corresponding coils of said sets of coils.

8. An electrically driven movement comprising a source of alternating current, an electromagnet, rectifying means for generating a unidirectional exciting field between the poles of said electromagnet proportional to the current flow in said source, an armature movable in said exciting field and including a set of coils, a second electromagnet, an energizing coil for said second electromagnet and connected to said source, the current flow through said energizing coil being proportional to the voltage of said source, a second set of coils movable with said armature, said second set of coils having current induced therein by said second electromagnet, and a rectifier of the static type connected between corresponding ones of each of said sets of coils, the direction of current flow through said first set of coils being determined by the rectifiers and the strength of the current flow in said first set of coils being controlled by the instantaneous position of said second set of coils with respect to said electromagnet.

GEORGE FREDERICK SHOTTER.